United States Patent [19]

Maynard et al.

[11] Patent Number: 4,723,904
[45] Date of Patent: Feb. 9, 1988

[54] APPARATUS FOR USE IN CENTRIFUGAL MOULDING

[75] Inventors: Brian Maynard, Wing; John Tiranti, Reading, both of England

[73] Assignee: Centricast Limited, Reading, England

[21] Appl. No.: 825,799

[22] Filed: Feb. 4, 1986

[30] Foreign Application Priority Data

Feb. 5, 1985 [GB] United Kingdom ............... 8502883

[51] Int. Cl.$^4$ ............................................. B29C 39/08
[52] U.S. Cl. ........................................ 425/425; 164/29; 164/286; 164/292; 264/311
[58] Field of Search ............... 425/435, 425; 264/311; 249/137; 164/29, 286, 287, 289, 290, 292, DIG. 3, DIG. 4

[56] References Cited

U.S. PATENT DOCUMENTS

| 1,908,170 | 5/1933 | Naugle et al. | 264/311 X |
| 2,026,624 | 1/1936 | Flower | 264/311 X |
| 2,618,031 | 11/1952 | Mazer | 264/311 X |
| 3,095,260 | 6/1963 | Ferriot | 264/311 |
| 3,290,423 | 12/1966 | Hatch et al. | 425/425 X |
| 3,301,925 | 1/1967 | Engel | 425/425 X |
| 3,505,437 | 4/1970 | Eichmann et al. | 264/311 X |
| 3,742,109 | 6/1973 | Zijp et al. | 264/311 |
| 4,063,863 | 12/1977 | Hilmoe | 425/425 |
| 4,082,586 | 4/1978 | Osment | 264/311 X |
| 4,167,381 | 9/1979 | Hilmoe | 425/425 X |
| 4,373,933 | 2/1983 | Grazen | 264/311 X |
| 4,416,841 | 11/1983 | Corea et al. | 264/311 X |

FOREIGN PATENT DOCUMENTS 174037 2/1953 Austria ........................... 164/292

Primary Examiner—Richard L. Chiesa
Attorney, Agent, or Firm—Harness, Dickey & Pierce

[57] ABSTRACT

Apparatus in which moulds may be prepared by centrifugal casting comprises a moulding case comprising two plates and spacing means such as two spacing rings therebetween, each of the plates having an opening on or near a central axis of the case for supply of a room temperature vulcanizing (RTV) rubber or molten casting material in the case, means for clamping the two plates together such as a clamping nut threaded on a pillar; and means for spinning the moulding case about a central axis such as a motor-drivable turntable. The moulding case is spun about the said central axis and simultaneously RTV rubber supplied into the moulding case to prepare a mould. A cast may be taken in the resulting mould spinning the mould whilst supplying molten casting material into the mould. Spinning is continued until the casting material has solidified.

4 Claims, 4 Drawing Figures

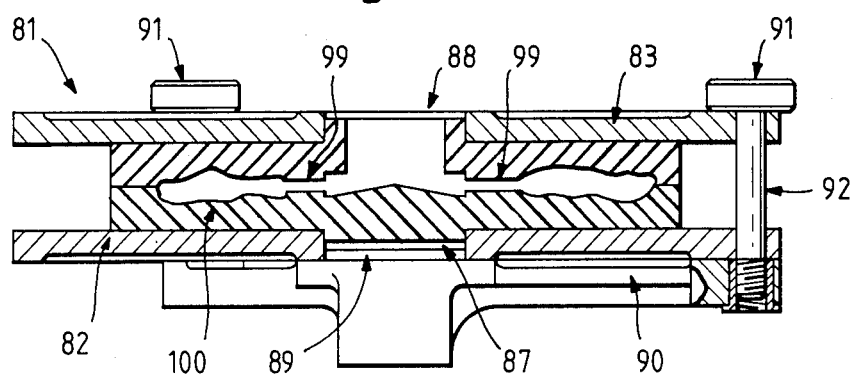
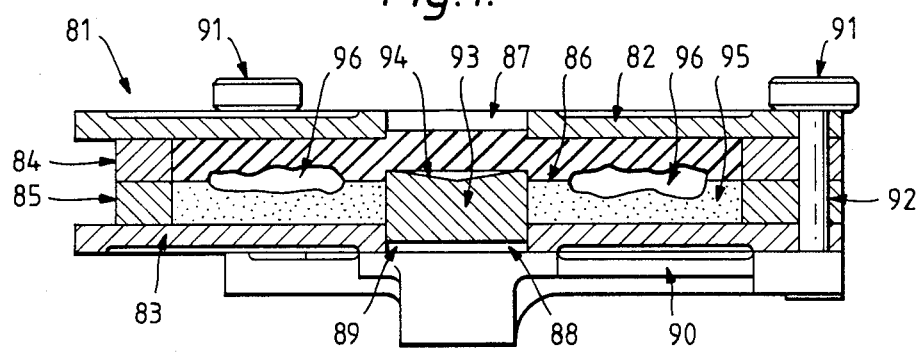
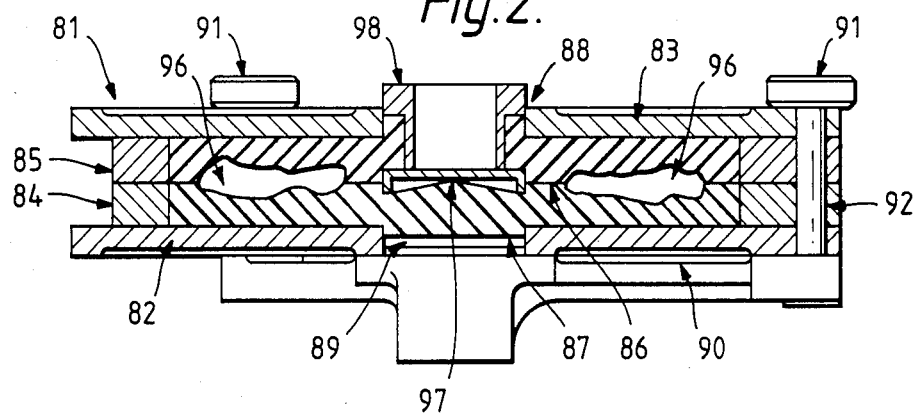

APPARATUS FOR USE IN CENTRIFUGAL MOULDING

FIELD OF THE INVENTION

This invention relates to apparatus for use in moulding and methods of making a mould and of casting using the moulds so obtained.

BACKGROUND OF THE INVENTION

In model-making, articles traditionally are cast in vulcanised rubber moulds. However, heat and pressure are required to prepare these moulds. This can cause difficulties in making the moulds and limits the materials which may be used as masters.

It has now been discovered that high definition castings can be obtained from moulds employing apparatus which spins the moulds and in which the moulds themselves may be prepared.

OBJECTS OF THE INVENTION

It is an object of the present invention to provide a method of producing a mould, whereby the formation of air bubbles in the region of the mould at the interface between the mould and the moulded article is minimised.

SUMMARY OF THE INVENTION

The present invention provides apparatus suitable for use in moulding, which apparatus comprises a moulding case comprising two plates and spacing means therebetween, each of the plates having an opening on or near a central axis of the case for supply of liquid thereinto; means for clamping the two plates together; and a drivable turntable for spinning the moulding case about the said central axis; wherein the openings in both plates of the moulding case are identical such that the moulding case is reversible on the turntable.

A further aspect of the invention provides a method of preparing a cast of an article from a mould of the article, which method comprises providing a mould which has an opening on or near a central axis thereof for supply of molten casting material into the mould and which has been prepared by the above method and spinning the mould about the said central axis both whilst supplying molten casting material into the mould and subsequently until the casting material thus introduced into the mould has solidified.

The moulding case is preferably circular. The two plates forming the top and bottom of the moulding case may be spaced apart by an integral flange around the edge of one or both plates or by one or more spacing rings.

Preferably, a motor-drivable turntable is provided to spin the moulding case. The turntable may comprise a plurality of arms, typically three, radiating from a central spindle. Generally, at the end of each arm a pillar is provided onto which a nut may be threaded. The pillars enable the moulding case to be correctly located on the turntable and the nuts are threaded onto the pillars to clamp the moulding case together and to the turntable. A boss may be provided on the turntable, preferably on the central spindle, for fitting a complementary recess or opening in the base plate of the moulding case. The turntable may form one of the plates of the moulding case.

In a particularly preferred embodiment, the two plates of the moulding case have identical openings on or near the central axis of the moulding case. The moulding case can then be placed either way up on the turntable. When a mould is made of two half-moulds, each half mould can then be prepared in turn in the upper half of the moulding case by reversing the moulding case on the turntable once the first half-mould has been prepared. This is advantageous because it avoids the problem of rising bubbles of residual air in the rubber from which each half-mould is made.

When preparing a mould by centrifugal casting, a mould is generally made in parts in the moulding case, preferably in the form of two complementary half-moulds. Each half-mould is made separately by supplying RTV rubber into the moulding case through an opening on or near the central axis of the moulding case. Simultaneously, the moulding case is spun about its central axis. Means will be provided for forming a pouring hole on or near the central axis of the mould for the subsequent supply of molten casting material into the finished mould. This may be achieved by inserting a plug into the opening on or near the central axis of the moulding case when preparing the upper half of the mould.

Preparing a mould by centrifugal casting overcomes the problem of the air in the rubber from which the mould is being made. If no precautions are taken to remove the air in the rubber, air bubbles form in the mould whilst the rubber cures. These bubbles can affect the impressions made by a master in a mould. Consequently, complicated procedures such as vacuum deairing of the rubber have previously been adopted to remove as much air as possible from the rubber just before it is used to make a mould. Centrifugal casting of a mould according to the present invention does away with the need for this.

For centrifugal casting of a mould according to the invention, the speed at which the moulding case is spun depends upon a variety of factors such as the size of the moulding case and the rubber being employed. Generally, however, the moulding case is spun at from 300 to 1000 rpm, preferably from 600 to 1000 rpm.

Preferably, the RTV rubber is a RTV silicone rubber. Liquid rubbers are preferred. The rubbers are catalysed for use. They may be heat-resistant, for example up to at least 260° C., depending on the material in which articles are to be cast in the resulting mould. A one component rubber or a two component rubber may be employed. The parts of the two component rubber are mixed together prior to use to catalyse the rubber. Preferred rubbers are the silicone rubbers RTV-11, RTV-31, RTV-60, and RTV-28 (General Electric) and their appropriate catalysts. RTV-31 and RTV-60 are iron-oxide heat stabilised and are firmer, which is an advantage because there is less deformation when casting metals.

As their name implies, RTV rubbers cure at room temperature. There is therefore no need to apply heat and pressure. Consequently, high definition moulds can be made from originals such as plant materials and plastics articles. Such originals would be damaged in conventional methods of preparing vulcanised rubber moulds. Indeed, the present invention has wide applicability and can be used to prepare moulds of models including model figures such as soldiers, jewellery and small items for use in engineering from metal masters as well as from masters composed of other materials.

The method of the present invention can be adapted to prepare moulds of full figures or of reliefs. In either case, RTV rubber is supplied into a moulding case against a surface provided with a master or masters of the or each article of which a mould is to be made and is allowed to cure to form a half-mould. Further RTV rubber is subsequently supplied into the moulding case against a surface of the thus-formed half-mould in which the master is provided. This rubber cures to form the other half of the mould.

In more detail, a full figure mould may be prepared by:

(a) embedding the or each master part-way into the surface of a modelling compound, (b) supplying RTV rubber against the said surface of the modelling compound and allowing the rubber to cure to form a half-mould, (c) removing the modelling compound to provide the thus-formed half-mould with the or each master inserted part-way into the surface thereof, (d) inverting the mould case, and (e) supplying further RTV rubber against the said surface of the half-mould and allowing the rubber to cure to form the other half of the mould.

A relief mould may be prepared by:

(a') positioning the or each master on a surface, (b') supplying RTV rubber against the said surface and allowing the rubber to cure to form a half-mould, (c') removing the said surface to provide the thus-formed half-mould with the or each master inserted therein, (d') inverting the mould case, and (e') supplying further RTV rubber against the said surface of the half-mould and allowing the rubber to cure to form the other half of the mould.

A pouring hole is provided in each mould prepared according to the present invention. The opening communicates, for example by sprue channels, with the or each cavity in the interior of the mould corresponding to the or each master. Where two half-moulds are prepared, for example, a central hole may be provided in one of the half-moulds from which sprue channels radiate to the or each cavity in the interior of the mould; matching sprue channels may also be cut additionally in the other half-mould.

In more detail a mould can be placed between the two plates of a moulding case, one of the plates having an opening on or near a central axis of the mould for supply into the mould of molten casting material. There is no need to provide spacing means between the two plates. The two plates are then clamped together with the mould in between and the mould is spun about the said central axis thereof whilst supplying molten casting material into the mould and subsequently until the casting material has solidified.

The apparatus of the invention can therefore be used to take castings. The moulding case employed in the second method of the invention must be correctly dimensioned so that the moulds produced in it fit the apparatus used to take a cast.

Casts may be prepared from any suitable material which is solid at room temperature but melts on heating. For example, metals such as tin or low melting alloys such as white metal, zinc alloys, plastics and wax may be cast. However, the temperature of the material when molten must not be so great as to cause damage to the moulds.

The invention may also be used for impregnating electrical components in a RTV rubber.

BRIEF DESCRIPTION OF THE DRAWINGS

The present invention will now be described, purely by way of example, with reference to the accompanying drawings, in which:

FIG. 1 is a section through apparatus being used for preparing a full figure mould by centrifugal casting, and showing the first half-mould already cured;

FIG. 2 is a section through the apparatus of FIG. 1 in which the second half-mould is in the process of curing;

FIG. 3 is a section through the apparatus of FIGS. 1 and 2 showing the final mould ready for the preparation of a cast of an article in it.

DESCRIPTION OF THE PREFERRED EMBODIMENT

Figure 4:
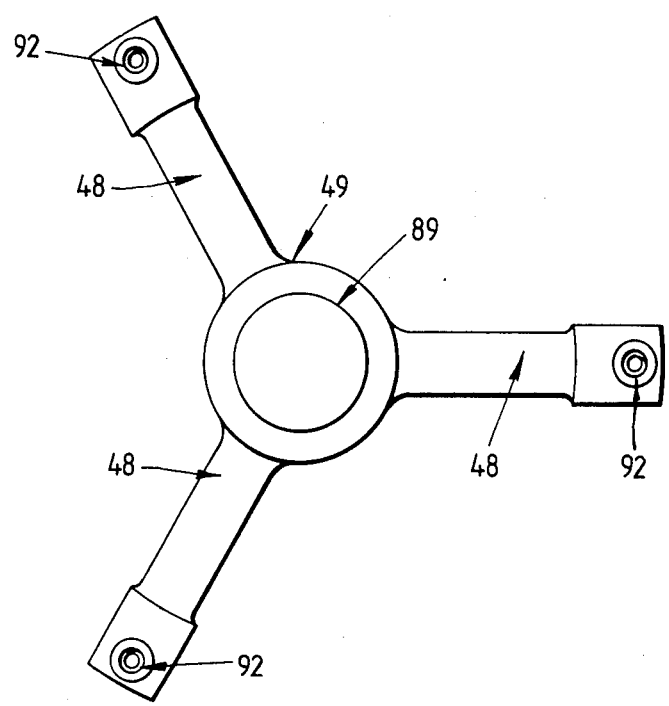
FIG. 4 is a plan view of the turntable in FIGS. 1 to 3.

Preferred apparatus for the preparation of a mould according to the present invention by centrifugal casting is shown in FIGS. 1 to 3. A moulding case 81 comprises two identical plates 82 and 83 spaced apart by spacing rings 84 and 85 to define a moulding chamber 86. The two plates 82 and 83 have identical central holes 87 and 88 respectively. The hole 88 in the lower plate 83 fits a central boss 89 on a turntable 90 on which the moulding case 81 is positioned.

The moulding case 81 is clamped together and onto the turntable 90 by means of clamping nuts 91 threaded onto pillars 92 spaced around the periphery of the turntable 90. Preferably, the turntable 90 is as shown in FIG. 4 and consists of three arms 48 radiating from a central spindle 49 on which is provided a boss 89 which engages with a corresponding opening or recess in the bottom of each plate of the mould case. A pillar 92 is located at the end of each arm 48. The top portions of the pillars are threaded for engagement with clamping nuts 91. In this way the upper plate and lower plate of the moulding case 81 may be clamped together and to the turntable 90.

In the apparatus of FIGS. 1 and 2, both half-moulds are made separately in the upper half of the moulding chamber 86. In this way, any air bubbles in the RTV rubber introduced into the moulding chamber 86 rise upwards and away from the surface of the half-mould in which an impression of the or each master is being formed. Consequently, the surface of the impression of the or each master in the half-mould is not deformed by rising air bubbles, as may be the case if the half-mould were prepared in the lower half of the moulding chamber 86.

Referring to FIG. 1, when the first half-mould is formed in the moulding chamber 86, a cylindrical plug 93 is fitted into the central hole 88 in the lower plate 83 of the moulding case 81. This plug 93 extends upwards just over half of the depth of the moulding chamber 86. A shallow conical recess 94 is provided in the top of the plug 93.

A soft modelling compound 95 is provided in the lower half of the moulding chamber 86. Masters 96 of the or each article of which it is wished to make a mould are embedded to approximately half their depth in the modelling compound 95.

Although not shown in FIGS. 1 to 3, balls, typically three, are embedded approximately equidistantly around the periphery of the modelling compound to provide key locations in the final mould to ensure that the two half moulds remain correctly registered.

The moulding case 81 is then clamped onto the turntable 90 and spun. RTV rubber is supplied into the upper half of the moulding chamber 86 through the central hole 87 whilst the moulding case is being spun. When the moulding chamber is full of rubber, rotation is stopped and the rubber allowed to cure.

The surface of the cured half-mould is then sprayed with a release agent such as 5% Petroleum Jelly in white spirit.

The second half-mould is formed by reversing the moulding case 81 on the turntable 90, as shown in FIG. 2. The central hole 87 in what was the upper plate 82 is now fitted over the central boss 89 on the turntable 90. The modelling compound 95 is removed, leaving the masters 96 positioned in the corresponding hollows in the first half-mould which now takes up the lower half of the moulding chamber 86. The lower half-mould has a circle of indentations on its surface, corresponding to the balls (not shown) previously positioned around the periphery of the modelling compound 95.

A cap-former 97 is provided, fitting over the shallow conical center of the first half-mould. The surface of the first half-mould is sprayed with a release agent. The moulding case is then clamped onto the turntable 90. Whilst the moulding case is being rotated, further RTV rubber is introduced into the top half of the moulding chamber 86. When full, rotation is stopped, a pouring-hole former 98 is inserted in the central hole 88 in what is now the upper plate 83 and the rubber is allowed to cure.

When the masters 96 have been removed as well as the cap-former 97 and pouring hole-former 98, the mould may be set up for centrifugal casting as illustrated in FIG. 3 after sprue channels 99 have been cut in the final mould 100. To prepare a cast, the moulding case 81 is spun and molten casting material introduced into the mould through the central hole 88 in the upper plate 83. Rotation is continued until the casting material has solidified. The casts that have been produced are then removed from the mould.

The apparatus of FIGS. 1 to 3 can be used for the centrifugal casting of relief moulds. The relief is simply attached to the surface of the modelling wax 85, and mouldmaking carried out exactly the same way as for figures.

We claim:

1. Apparatus suitable for use in producing a mould for use in centrifugal moulding, which apparatus comprises a drivable turntable having a central axis about which it is rotatable and a moulding case securable on said turntable for spinning about said central axis, said moulding case comprising an upper plate and a lower plate, each said plate having a central opening therethrough on said axis, and spacing means between and engaging the facing surfaces of said plates to define the outer periphery of a moulding chamber, the top and bottom of which is defined by said plates and which communicates with said openings, the openings in the two plates being identical whereby the moulding case is reversable on the turntable, the opening in the lower plate being closed by said turntable and the opening in the upper plate being adapted for receipt of moulding material, said spacing means comprising a pair of similar spacing rings, one of said spacing rings having an upper surface engaging the facing surface of the upper plate and the other of said rings having a lower surface engaging the facing surface of said lower plate, the spacing rings being separable from each other at a location spaced from the facing surfaces of the upper and lower plates to permit the moulding of two separable upper and lower mould halves in the moulding chamber.

2. Apparatus according to claim 1, wherein the turntable comprises a plurality of arms radiating from a central spindle.

3. Apparatus according to claim 1, wherein said turntable comprises an upwardly projecting boss adapted to fit into and close the central opening of said lower plate.

4. Apparatus according to claim 1, including a removable pouring hole former adapted to be received within the opening of said upper plate to define an axial opening in material in said moulding chamber defined in said mould casing during moulding of said material to form a mould in said moulding chamber.

* * * * *